United States Patent
Blama et al.

(10) Patent No.: US 6,304,169 B1
(45) Date of Patent: *Oct. 16, 2001

(54) INDUCTOR-CAPACITOR RESONANT CIRCUITS AND IMPROVED METHODS OF USING SAME

(75) Inventors: Michael J. Blama, Baltimore; J. Steve Freeman, Jarrettsville, both of MD (US)

(73) Assignee: C. W. Over Solutions, Inc., Aberdeen, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,919

(22) Filed: Dec. 30, 1997

Related U.S. Application Data

(60) Provisional application No. 60/034,695, filed on Jan. 2, 1997.

(51) Int. Cl.⁷ ....................................................... H04Q 5/22
(52) U.S. Cl. .................. 340/10.1; 340/572.1; 340/572.4; 340/572.5; 340/572.7; 342/22; 342/42; 342/44; 235/380; 235/382; 235/492; 343/895
(58) Field of Search ........................... 340/825.54, 572.1, 340/572.4, 572.8, 572.5, 572.7, 10.1; 342/22, 42, 44; 235/380, 382, 492; 343/895

(56) References Cited

U.S. PATENT DOCUMENTS

| | | |
|---|---|---|
| 3,958,105 | 5/1976 | Sidlauskas . |
| 3,970,824 | 7/1976 | Walton et al. . |
| 4,142,674 | 3/1979 | Walton . |
| 4,560,445 | 12/1985 | Hoover et al. . |
| 4,583,099 | 4/1986 | Reilly et al. . |
| 4,598,276 * | 7/1986 | Tait .................................... 340/572.5 |
| 4,612,877 | 9/1986 | Hayes et al. . |
| 4,688,026 | 8/1987 | Scribner et al. . |
| 4,694,283 | 9/1987 | Reeb . |
| 4,745,401 | 5/1988 | Montean . |
| 4,882,569 | 11/1989 | Dey . |
| 4,910,499 | 3/1990 | Benge et al. . |
| 5,081,445 * | 1/1992 | Gill et al. ........................... 340/572.5 |
| 5,103,210 | 4/1992 | Rode et al. . |
| 5,108,822 | 4/1992 | Imaichi et al. . |
| 5,119,070 | 6/1992 | Matsumoto et al. . |
| 5,159,332 | 10/1992 | Walton . |
| 5,218,189 | 6/1993 | Hutchison . |
| 5,381,137 | 1/1995 | Ghaem et al. . |
| 5,444,223 | 8/1995 | Blama . |
| 5,447,779 | 9/1995 | Imaichi et al. . |
| 5,510,769 | 4/1996 | Kajfez et al. . |
| 5,563,582 * | 10/1996 | D'Hont ............................. 340/572.5 |
| 5,589,251 | 12/1996 | Imaichi et al. . |
| 5,754,110 * | 5/1998 | Appalucci et al. ................ 340/572.5 |
| 5,781,110 * | 7/1998 | Habeger et al. ................... 340/572.5 |
| 5,808,587 * | 9/1998 | Shima .................................... 343/895 |

\* cited by examiner

*Primary Examiner*—Brian Zimmerman
*Assistant Examiner*—Yves Dalencourt
(74) *Attorney, Agent, or Firm*—Irah H. Donner; Luke J. Yeh; Hale and Dorr LLP

(57) ABSTRACT

A tag which uses radio frequency waves transmitted from a scanning device in order to identify an item to which the tag is attached or with which the tag is associated. The tag includes a first insulating layer having a top surface and a bottom surface, and resonant circuits formed on the first insulating layer. Each of the resonant circuits are formed on one of the top surface and the bottom surface of the first insulating layer and have a resonant frequency associated therewith. Each of the resonant circuits include capacitance and inductance elements. The capacitance and inductance elements include an inwardly spiralled coil connected to an outwardly spiralled coil. The tag is associated with a binary number established by a pattern of ones and zeros depending on each circuits' resonance or nonresonance, respectively.

47 Claims, 13 Drawing Sheets

INDUCTOR-CAPACITOR RESONANT CIRCUITS AND IMPROVED METHODS OF USING SAME

RELATED APPLICATIONS

This application claims priority from U.S. provisional application serial number 06/034,695, filed on Jan. 2, 1997, the details of which are hereby incorporated by reference.

BACKGROUND OF THE INVENTION

1. Field of the Invention

The present invention relates generally to electronic item identification systems and more particularly, to a radio frequency (RF) identification tag and method for identifying an item to or with which the tag is attached or associated, respectively, wherein each tag includes a plurality of circuits having a capacitance.

2. Background of the Related Art

Conventionally, transportation of goods is conducted by utilizing railways, trucks, ships, airplanes and so on. In recent years, however, transportation of light-weight parcels by small trucks or the like, called Takuhaibin, have become very popular because of its low cost. In this type of transportation, a forwarding agent collects and delivers parcels to destinations in a short period of time. This transportation is known by its simple procedure and fast delivery of parcels.

In such transportation, parcels are attached with a label on which a sender, a destination and so on are filled in. A delivery man looks at the labels on the parcels and thereby checks the destinations and conducts sorting out of the parcels. Recently, checking of destinations and sorting out of the parcels have also been conducted in the following manners: in one method, destinations are coded, and sorting out of the parcels are conducted using the coded destinations. In another method, a delivery man carries with him or her a bar code system, and parcels carry on them a label on which bar codes representing a sender, destination and so on are printed.

However, in this transportation method, parcels are often delivered to a wrong destination or lost before they reach the destinations. Such accidents cost a forwarding agent substantial sums of money for investigation and compensation.

These accidents may be decreased by reinforcing visual checking of parcels. However, reinforcement of visual checking of parcels increases cost and prolongs the time for delivery. In any way, it requires manpower and limits reliability. Currently, electronic item identification systems are in widespread use today to identify a variety of items. A first type of electronic item identification system commonly used in industry is one in which bar code labels are used to identify items. These types of electronic item identification systems are typically used by supermarkets, distributors, shipping services and clothing retailers to scan the bar code labels for quick retrieval of an item's price or other information.

The way conventional bar code identification systems work is as follows. Bar codes labels are made up of a series of lines of varying widths or thicknesses to establish a code which can be read by a scanner. A bar code label is usually read by a laser scanner. The data from the scanner is electronically fed to a receiver which determines the identification code or number associated with the bar code label. The identification code or number is then sent to a central processing unit or computer where each code or number is matched to data stored on a master list such as item price or other information. The central processing unit or computer then electronically sends the stored data associated with the identification code or number to the cash register or other tabulator to arrive at a final total or tabulated result.

Another system of electronic item identification uses radio frequency (RF) identification tags to identify items. Radio frequency (RF) identification tags can be used to identify a variety of items to which the tags are attached or otherwise associated. In particular, radio frequency (RF) identification tags are currently used to identify passengers, luggage, library books, inventory items and other articles. Radio frequency (RF) identification tags will allow electronic identification of people or objects, moving or stationary, at distances of several feet.

Prior art devices short out capacitors during interrogation and thus the circuit can never be restored to its original frequency to be read over again. It is therefore desirable to develop an electronic item identification system in which the radio frequency (RF) identification tag can be read any number of times while still generating the same binary number as was read the first time and in this manner the tag can be reused.

It is also desirable to develop an electronic item identification system in which a radio frequency (RF) identification tag has numerous circuits made up of capacitor/inductor coil pairs at evenly spaced intervals on the surface of the tag so that the presence or absence of a circuit or the circuit's functionability could be programmed at the point of use with inexpensive equipment.

SUMMARY OF THE INVENTION

It is a feature and advantage of the present invention in providing an electronic item identification system in which the radio frequency (RF) identification tag can be read any number of times while still generating the same binary number as was read the first time and in this manner the tag can be reused.

It is another feature and advantage of the present invention in providing an electronic item identification system in which a radio frequency (RF) identification tag has numerous circuits made up of capacitor/inductor coil pairs at evenly spaced intervals on the surface of the tag so that the presence or absence of a circuit or the circuit's functionability could be programmed at the point of use with inexpensive equipment.

In accordance with one embodiment of the invention, a tag uses radio frequency waves transmitted from a scanning device in order to identify an item to which the tag is attached or with which the tag is associated. The tag includes a first insulating layer having a top surface and a bottom surface, and resonant circuits formed on the first insulating layer. Each of the resonant circuits are formed on one of the top surface and the bottom surface of the first insulating layer and have a resonant frequency associated therewith. Each of the resonant circuits include capacitance and inductance elements. The capacitance and inductance elements include an inwardly spiralled coil connected to an outwardly spiralled coil. The tag is associated with a binary number established by a pattern of ones and zeros depending on each circuits' resonance or nonresonance, respectively.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DESCRIPTION OF THE PREFERRED EMBODIMENT OF THE INVENTION

The present invention relates to improvements to the inductor capacitor (LC) resonant tag. There are currently a few different tags. There is a bar code tag, there are other radio frequency (RF) tags out there mainly of silicon chip type. There are currently no known multiple LC circuit tags. Multiple LC tags are used for identification purposes; generally three or more LC circuit are needed for identification purposes, although less may be possible.

In addition, in conjunction with the LC circuit is bar code identification, as well as using the RF silicon chip. This means that multiple types of reading must be done in order to identify a particular baggage or article. We have therefore discovered that multiple types of reading is required including reading of LC circuits, bar code and RF circuits for identification purposes.

Figure 1:
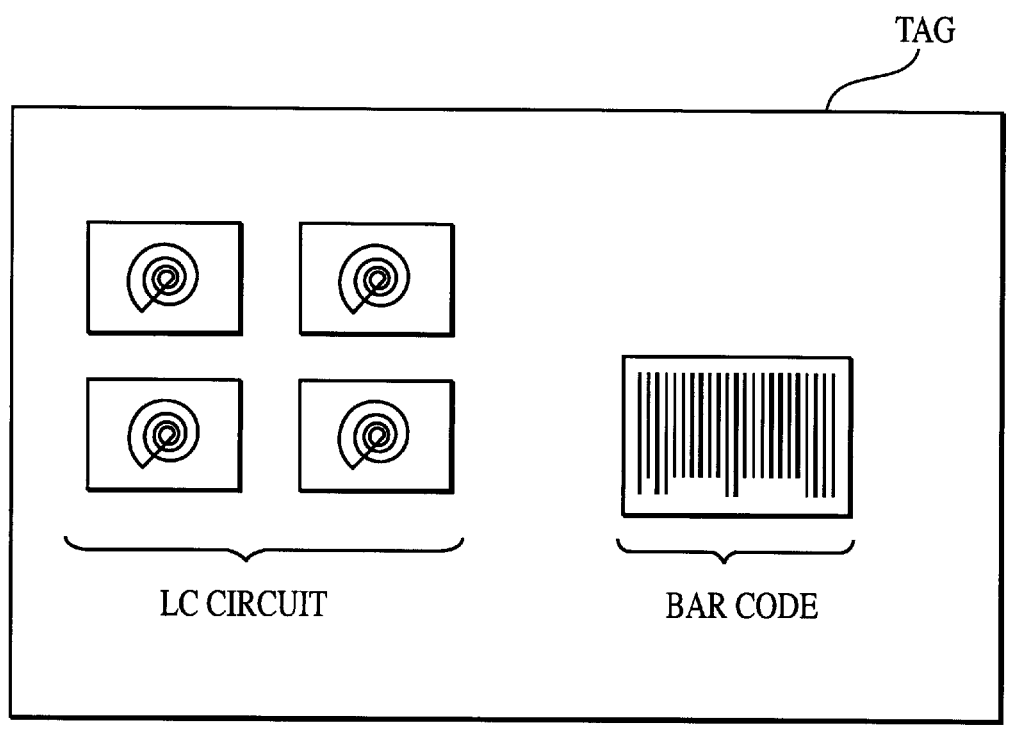
FIG. 1 is an illustration of an identification tag with an LC circuit and bar code combination.
Figure 1A:
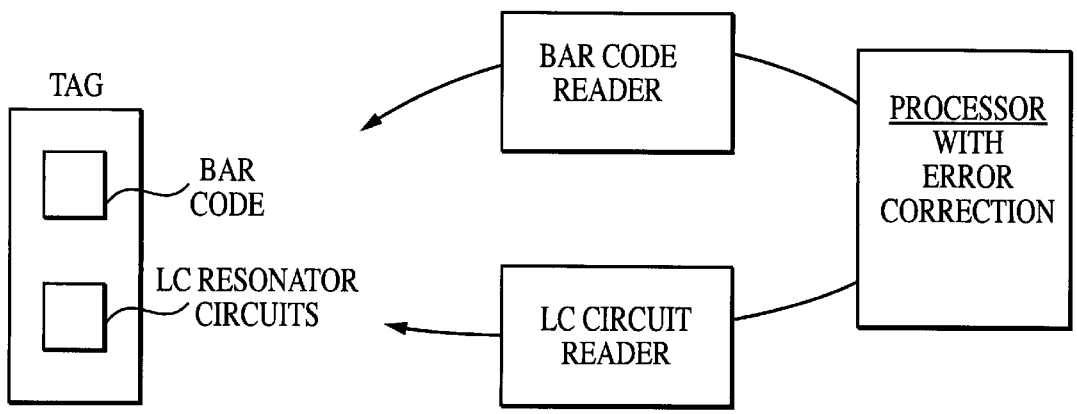
FIG. 1A is an illustration of a system capable of utilizing and/or reading the identification tag illustrated in FIG. 1.

Accordingly, one improved identification tag includes a tag which has a combination of LC devices for identifications, as well as a bar code for identification. FIG. 1 illustrates this combination. See U.S. Pat. No. 5,444,223 for an example of an LC circuit, incorporated herein by reference in its entirety. FIG. 1A illustrates an overall system for reading at least one of the bar code and/or LC Circuits. If both readers are utilized, then error correction and/or verification are possible by comparing the results of both readings, when available.

A second improvement includes taking these little coils on the LC circuit and attaching an antenna to it, like a radio for receiving and for transmitting back. This will improve the distance for receiving and resonating signals, efficiency, and accuracy.

Figure 2:
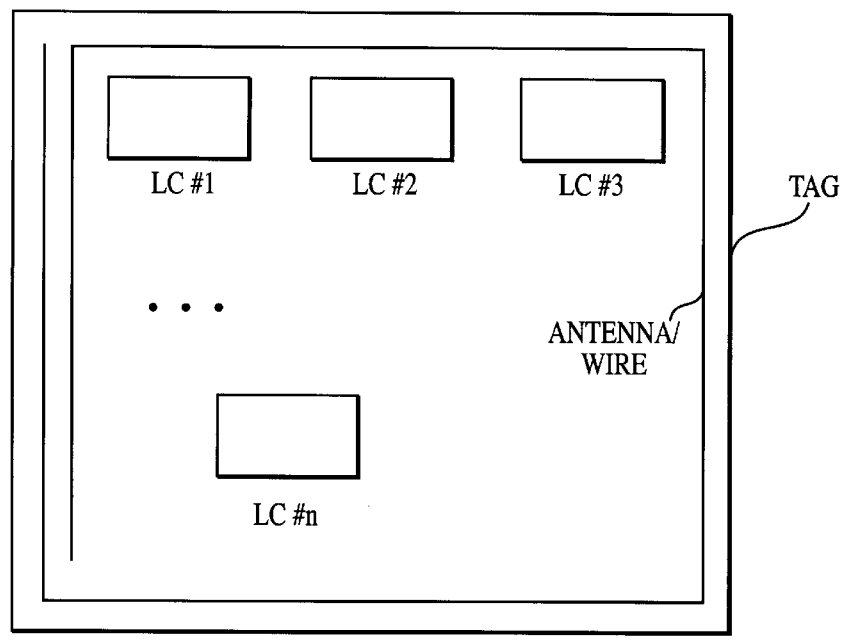
FIGS. 2–16 are illustrations of different embodiments of the identification tag using different LC circuit designs.
Figure 3:
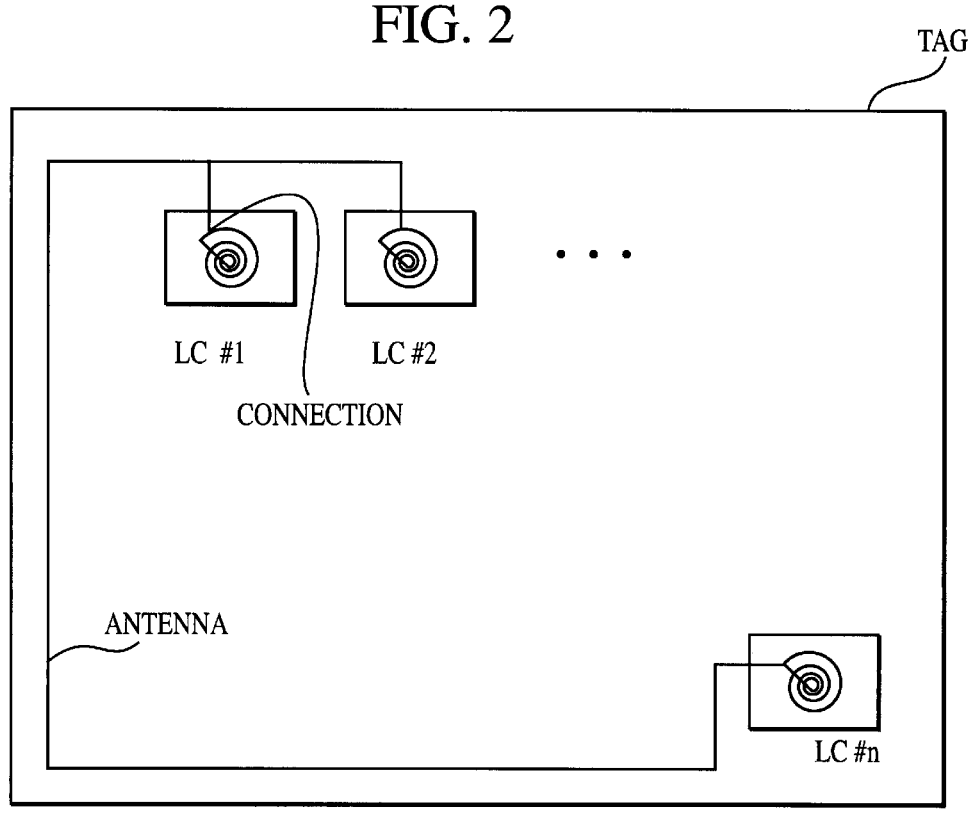

One type of antenna is just a wire antenna; the antenna alone with no physical contact to the individual LC circuits (see FIG. 2). Another type of antenna is where there is an electrical connection to each of the inductor coils. This will generally provide a varied frequency that will be resonated from each of the LC circuits in a predetermined manner. For example, it might throw the frequency off by say half. So there might be an offset with the tradeoff of improved distance for receiving and resonating the signal. See FIG. 3 for one example of connecting the antenna to the different LC circuits. Of course, other type of connections to the LC circuit are contemplated within the present invention.

Another improvement relates to the use of magnetic material that has natural inductive properties for the LC circuit. Magnetic material is conductive and its also magnetic, with magnetic properties. When the material is not magnetized, the LC circuit will resonate at a certain frequency, and when the magnetic material becomes magnetized the inductive property changes and the frequency shifts as a result. So this improvement to the LC circuit involves making the inductor coil of magnetic material which can be magnetized to change its resonant frequencies, thereby providing an entire set of different frequencies that are resonated by the tag when the tag is magnetized.

Figure 4:
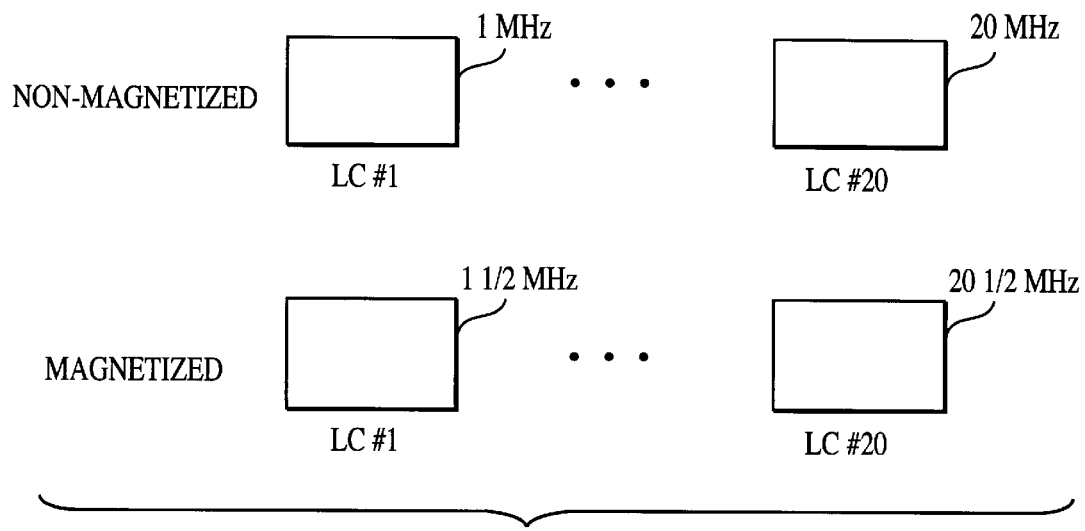

This tag works with for example a reader that is looking at frequencies, for example, 1 MHz, 2 MHz, 3 MHz and so on. If all the LC circuits are magnetized, the 1 MHz frequency will be sifted to, for example, 1 ½ which will not be read. FIG. 4 illustrates this principle conceptually. In this case, the reader could go through the exercise of looking for a magnetized frequency to assure that there are two positive reads versus a positive and negative. So that would be an advantage of the magnetized not magnetized scenario. It is better to look for two positive readings than a negative reading because the negative reading is more difficult to read.

This magnetized/unmagnetized embodiment leads to a potential third state, as well. That is, a positive magnetized, a positive non-magnetized, and a zero for the destroyed LC circuit. Thus, even more data can be obtained using less LC circuits. In a three state system the circuit is not simply resident or nonresident but instead has high quality residence, low quality residence, or is nonresidence.

There are several methods of reading the LC circuits. We have discovered that a sweep scan, for example one megahertz to forty, forty to fifty, and sweep all the way up through every frequency that is expected to be resonated by the LC circuits. Another type of reader is a step reader which would step, 1 mg, 2 mg, and the like all the way up. The reader shoots or transmits a signal at the tag and the determines whether the signal has been resonated back.

A third type of reading method is pulsing the signal and looking for a ring back signal that is resonated back. Accordingly, if the signal is transmitted as one megahertz, we have determined that the LC circuit stores enough energy to start oscillating. Once the reader has stopped transmitting the signal, the LC circuit is going to oscillate until the energy is used which is called the ring back. The first byte of the data will always be the same frequency represented by one LC circuit, the second byte will be a second frequency represented by another LC circuit, and so on.

Thus, the reading in general is as follows: first, a one megahertz signal is transmitted, at the whole tag. When a one megahertz LC Circuit is activated on the tag, a signal is resonated back to the reader. Only one of these LC circuits will answer when its tuned to one megahertz. The other LC circuits will stay dormant since its not the correct signal. So, if the one megahertz signal comes back, its a one in the place of that location of the binary number. Two megahertz signal, and so on, until all forty of the LC circuit are transmitted. If a signal is resonated back that location is a one, and if it does not come back, its a zero.

Another improvement in the tag is to selectively physically burn out, punch out or destroy the LC circuits to prevent selective LC circuits from resonating a signal back, therefore,' providing a zero value for that destroyed LC circuit.

Figure 5:
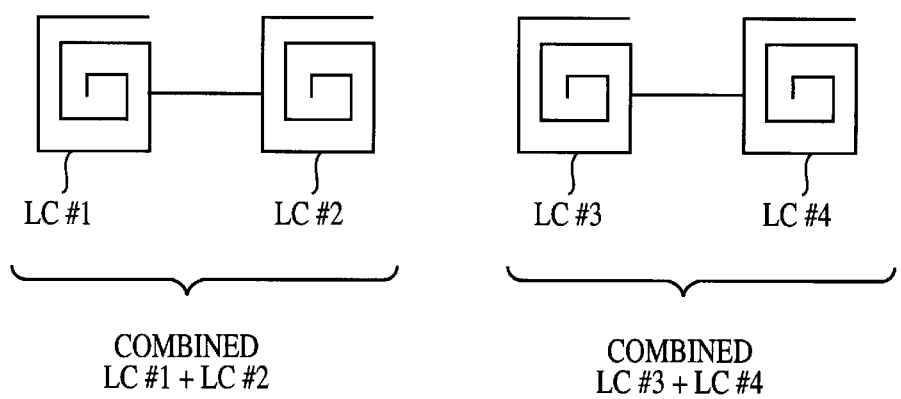
Figure 6:
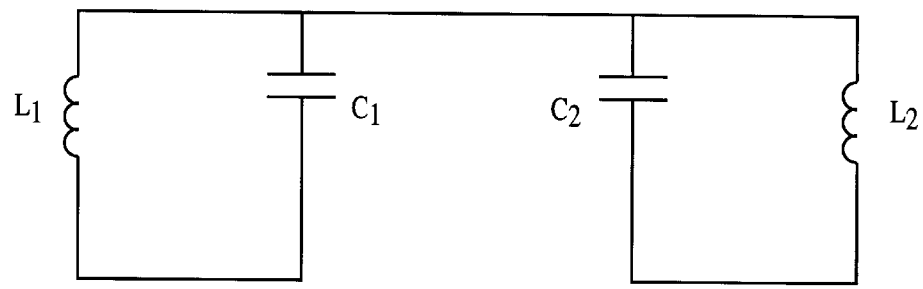

Another improved tag is if there is cross coupling between the LC circuits. For example, if the inductor coils of two LC circuits are connected together, there should be three resonant signals resulting in this combination. The first resonant signal is generated by the natural resonant frequency of the first LC circuit. The second resonant signal is generated by the natural resonant frequency of the second LC circuit. The third resonant signal is generated by the natural resonant frequency of the combination of the first and second LC circuits. FIG. 5 illustrates this combination of connecting pairs of LC circuits. Of course, more than two LC circuits can be connected to further generate additional frequencies. FIG. 6 illustrates the circuit diagram of FIG. 5 corresponding to this connection.

In accordance with FIG. 5, three distinct frequencies are resonatable from the circuit. However, the following combinations are possible. For example,
(1) frequency of LC #1 only (L #2 destroyed)
(2) frequency of LC #2 only (LC #1 destroyed)
(3) frequency of LC #1 and LC #2 only (no connection between LC #1 and LC #2)
(4) frequency of LC #1 and LC #2 and combined frequencies (connection exists between LC #1 and LC #2) (5) no frequencies Of course, all frequencies are unique in the combination of pairs of LC circuits, as well with other LC circuits to prevent confusion and ensure accurate identification. This then permits multiple states as well as to decrease the number of LC circuits to make the tag smaller. So now that there are potentially five states out of the combination of two LC circuits. The number of coils is reduced and the tag gets smaller.

Figure 7:
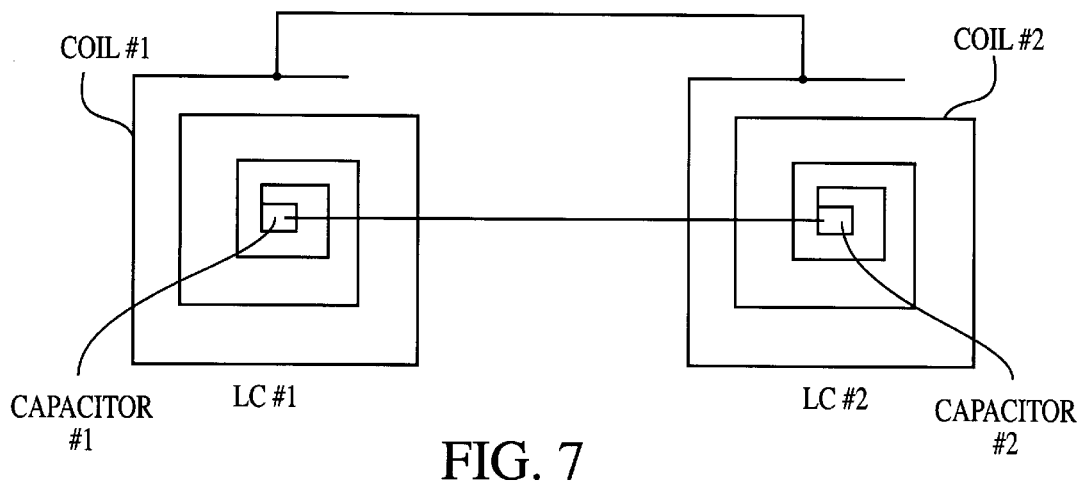
Figure 8:
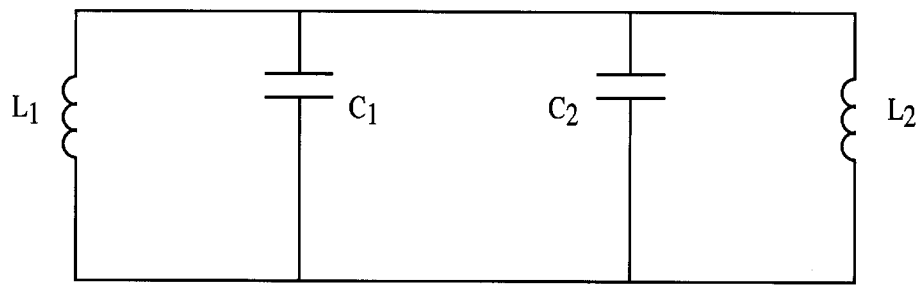

As an alternative connection between LC resonant circuits, the capacitors of each of the LC circuits can be connected as well as inductors. See FIG. 7 for this design, as well as FIG. 8 for an illustration of the conceptual circuit diagram. Note that the LC circuits are electrically connected in parallel. Of course, other modifications are also contemplated, such as only connecting the capacitors to form the combined resonant circuit, as well as other types of connections. the important discovery is that if LC circuits are electrically connected, then there will be a potential third frequency that can be resonated back.

The double spiral configuration of the coil provides an inherent LC resonant circuit as well. See FIG. 9 for an illustration of this double spiral configuration. Note that the inward or outward spiral references are merely illustrative of the spiral LC circuit concepts, and are not to be interpreted to limit the particular flow of the current therein. The spiral configuration of conductors are place on (or perhaps even disposed in) a dielectric substrate, similar to the configuration of the LC resonant tags previously described.

The spiral configuration is designed to minimize the manufacturing process. When it comes down to producing or manufacturing the LC circuit and tag associated therewith, the more steps the more costs. Therefore, we have determined that there is a natural state that exists between conductive material. For example, when there is a conductive material, a gap, and a conductive material there creates capacitance.

Figure 9:
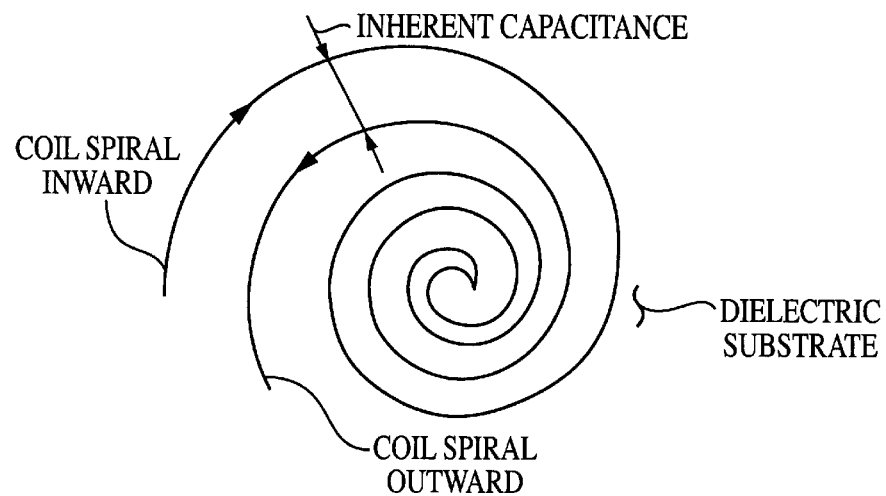

In the spiral configuration illustrated in FIG. 9, the L (inductance) negates itself because of the lines of flux. However, between the two conductors that are spiralling in and out, the number of lines and gaps is increased which creates its own capacitance that can be resonated like an ordinary LC circuit once a signal is transmitted to it.

Thus, the spiral configuration allows us to delete or remove the capacitor by just spiralling in and coming out. From a manufacturing stand point it is superior and easier to manufacture. The L is not generally increased, but the L is generally nullified the zero with some minor noise likely being present. That is, from the manufacturing standpoint, the end of the inductor does not need to be connected to a capacitor. Therefore, there is no need for a separate capacitor at the center of the tag.

Figure 10:
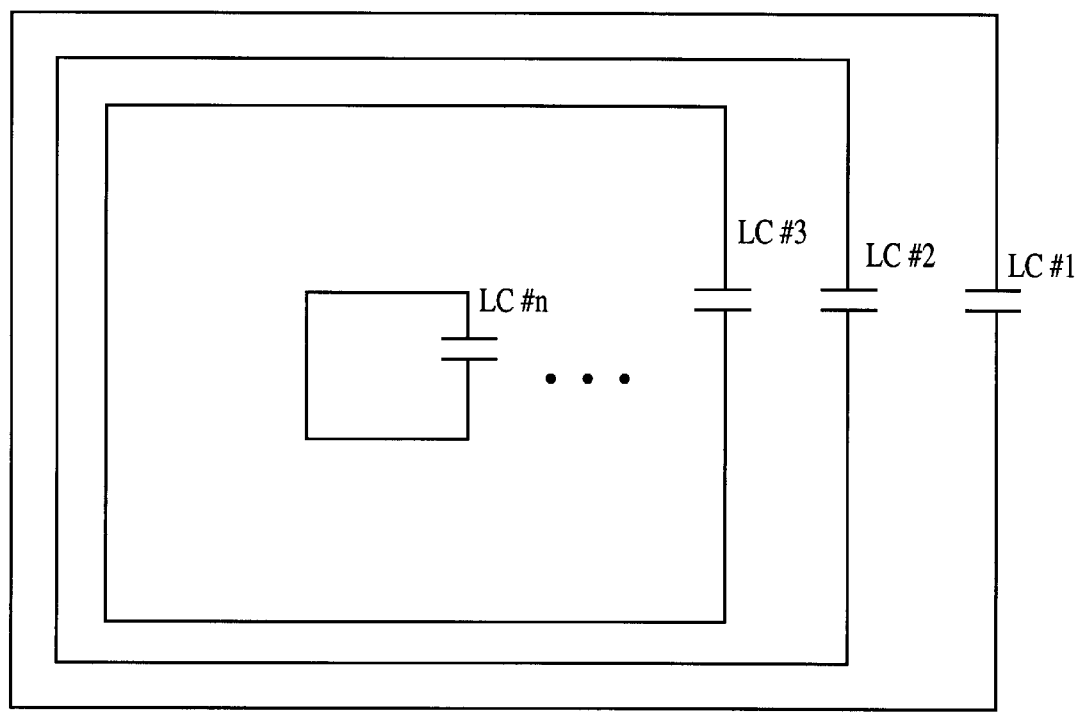

The next improved LC circuit design is the coiled capacitor design. We observed the standard LC resonant circuit did not have enough area to pick up the magnetic flux. On this basis, we decided to utilize an antenna as described above. However, we also discovered that there are significant advantages of putting one LC resonant circuit inside the other as illustrated in FIG. 10. As a result, there will be more combinations because LC circuit #1 resonates at, for example, frequency 1, LC circuit #2 resonates at, for example, frequency 2, and so forth. The combination of LC #1 and LC #2 will provide another frequency. Thus, the number of combinations of LC circuits in the tag are huge (approximately the factorial of the number of LC circuits in the tag that are inserted into one another).

Therefore, instead of having the LC circuits in rows and columns, the LC circuits are inside the other, inside the other, and so on. This combination of LC circuits can then be used for identification purposes. Each of the LC circuits are then selectively activated to arrive at a unique binary number than can be identified or associated with a particular article, in a similar manner the selective activation is conducted in U.S. Pat. No. 5,444,223, incorporated herein by reference.

Figure 11:
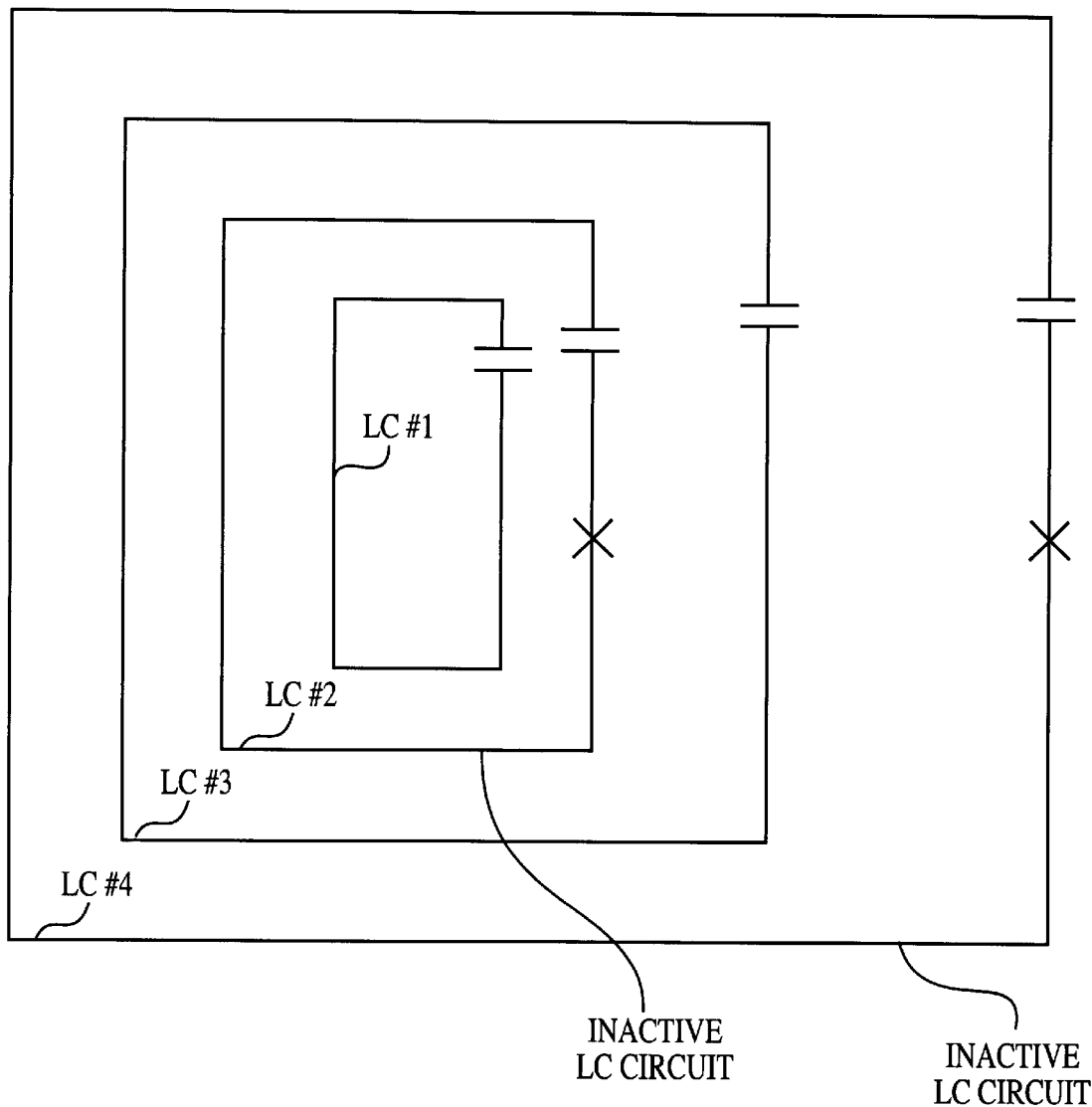

See, for example, FIG. 11 illustrating one configuration of a selectively activated LC circuit, where the binary number that identifies the tag as a result of this selective activation is: 1010, starting from the first LC circuit as the most significant bit, plus one or more additional frequencies that are a result of the coupling between LC circuit described in detail above, for example, in connection with electrically connecting LC circuits together. However, as is readily apparent in FIG. 11, there is no physical connection required between the LC circuits, but there is an inductive connection or coupling between the LC circuits. In addition, there is no specific magnetic coupling required, as discussed above in connection with magnetized and non-magnetized LC circuits.

Figure 12:
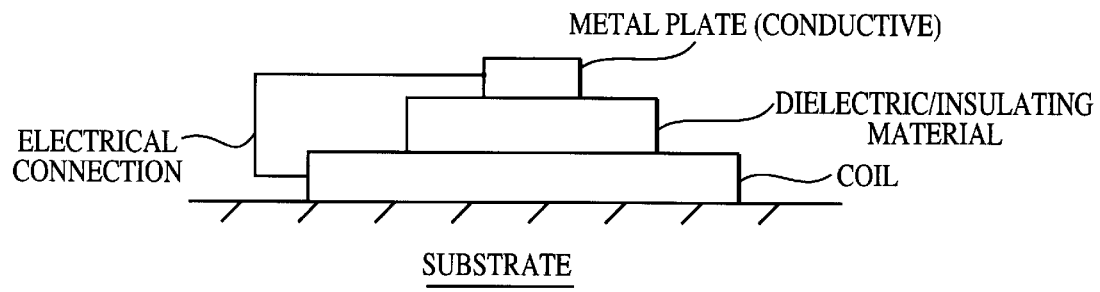
Figure 13:
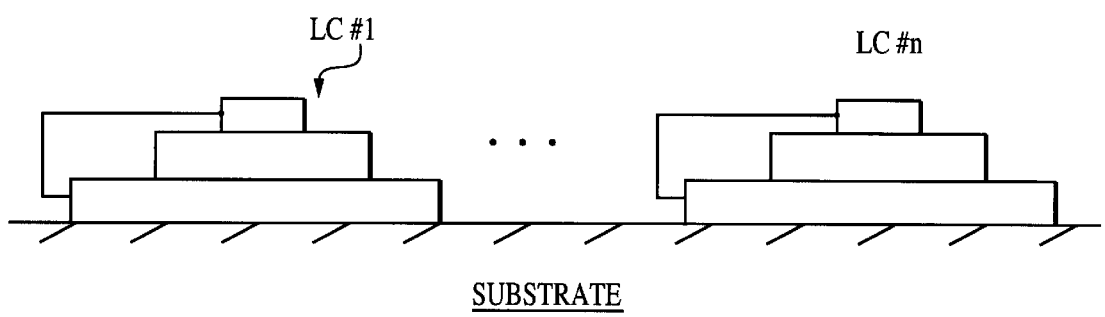

Variable capacity is the next improvement. The idea of variable capacity is the process of manufacturing a variable capacitor. The coil is on the substrate. Then a dielectric layer is placed over the coil. A metal or other conductive plate is then placed top of the dielectric layer. The metal plate is then varied from LC circuit to LC circuit to provide a varied and different frequency that is resonated from each of the different LC circuits. The metal plate is varied during the process of initializing the tag by taking a laser and cutting off the excess portion of the metal plate in a predetermined fashion. The coil is then electrically connected to the metal plate using standard means, such as a conductive material. FIG. 12 illustrates this configuration where the dielectric layer is smaller that the coil. FIG. 13 illustrates the use of multiple LC resonant circuit in accordance with the embodiment illustrated in FIG. 13.

By varying the metal or conductive plate, a different resonant frequency will result. The reason is that we have determined is that the determining factor of the capacitance of a capacitor is the area of the conductive plate with the dielectric layer and the coil that is underneath. So there are essentially two plates, the top conductive plate, and the conductive coil below. By changing the area of the top conductive plate, the overall capacitance is being changed. Therefore, in the manufacturing process of the tag or conductive plate where the conductive plate has been manufactured the same size, the next steps will be initializing the tag and LC circuits by varying the area of the metal plate.

Figure 14:
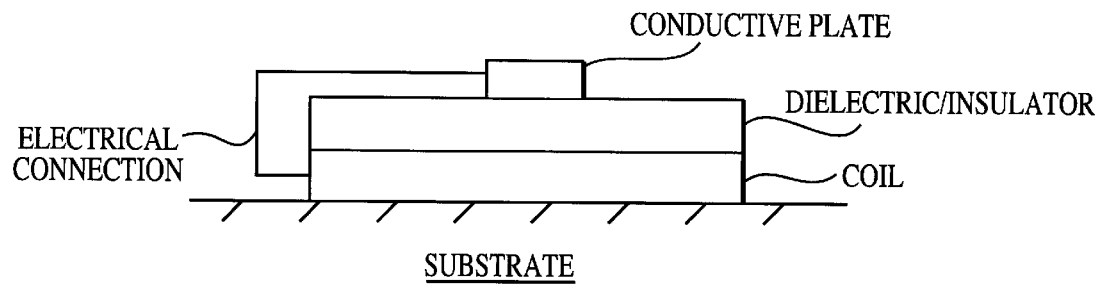

For example, it may be presumed that there is a mathematical relationship between the amount of area of the metal plate and the resulting capacitance/resonant frequency emanated therefrom. For example, by taking off the conductive plate an area of 0.2%, the overall change in frequency resonated therefrom will be, for example, 2 megahertz. Thus, the same inductive coil structure will be able to provide multiple resonant frequencies which can be customized on a tag by tag basis providing more frequencies for less LC circuits, resulting in a smaller tag area required for the LC circuits. yes, that will give us one coil with multiple frequency In another embodiment of this LC circuit design, the dielectric will actually cover the whole area of the coil, as illustrated in FIG. 4. Multiple LC circuits according to this design are then utilized as illustrated similarly in FIG. 13. It is important for this variable capacitor to, of course, have two plates. Thus, in both FIGS. 12 and 14, the area of the coil itself is being used as the second, bottom conductive plate to create the appropriate capacitance.

Figure 15:
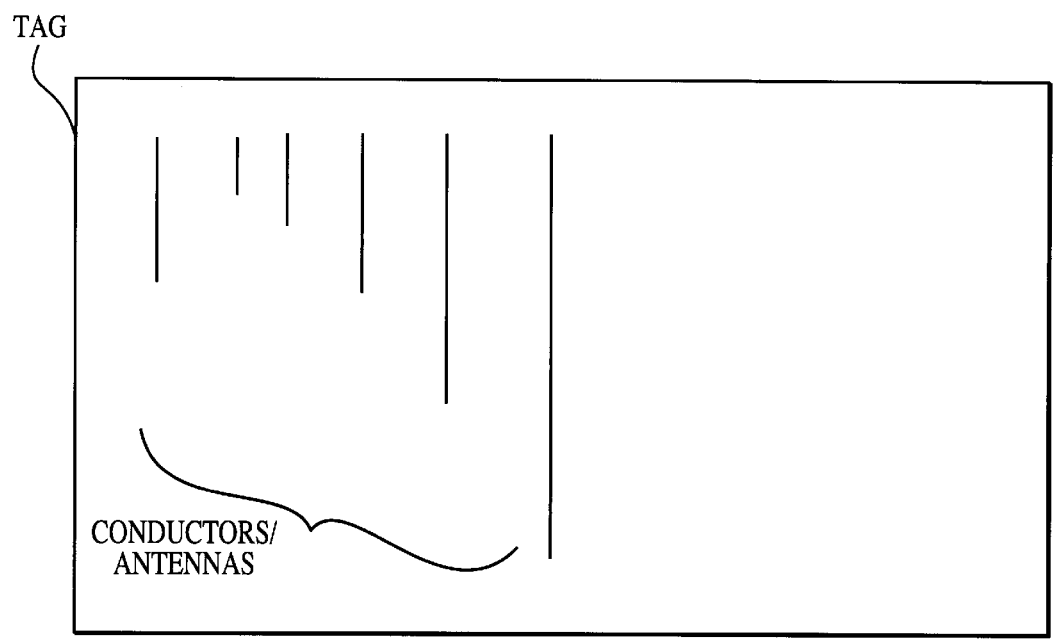

The next improved LC resonant circuit for use in identification purposes is the dipole LC resonant circuit. The dipole is basically an antenna. We have determined that an antenna has the characteristics of LC resonant circuits. An antenna or a frequency is equal to, or a function of, a particular length for an antenna of conductive material. FIG. 15 illustrates this combination of antennas according to one dipole design.

Now any one of the conductors/antennas illustrated in FIG. 15 could provide, for example, a resonant frequency of a quarter wave which is detectable. That is, the length of the conductor is a function of a particular frequency. Therefore, sticks or lines of wire or conductive material in actuality can be read by resonating different frequencies. In addition, by having multiple antennas within a predetermined distance, inductive coupling or affects result thereby resonating additional frequencies as a result of the inductive coupling, similar to the effects described in connection with FIG. 10.

Functionally, the operation of transmitting signals to the tags operate by transmitting a signal and receiving a frequency resonated back. So each antenna in FIG. 15 will have its own frequency that it resonates at, and by virtue of receiving a signal resonated back, it is deduced that a particular dipole corresponding to a specific binary location is there, which gives you a one basically.

Figure 16:
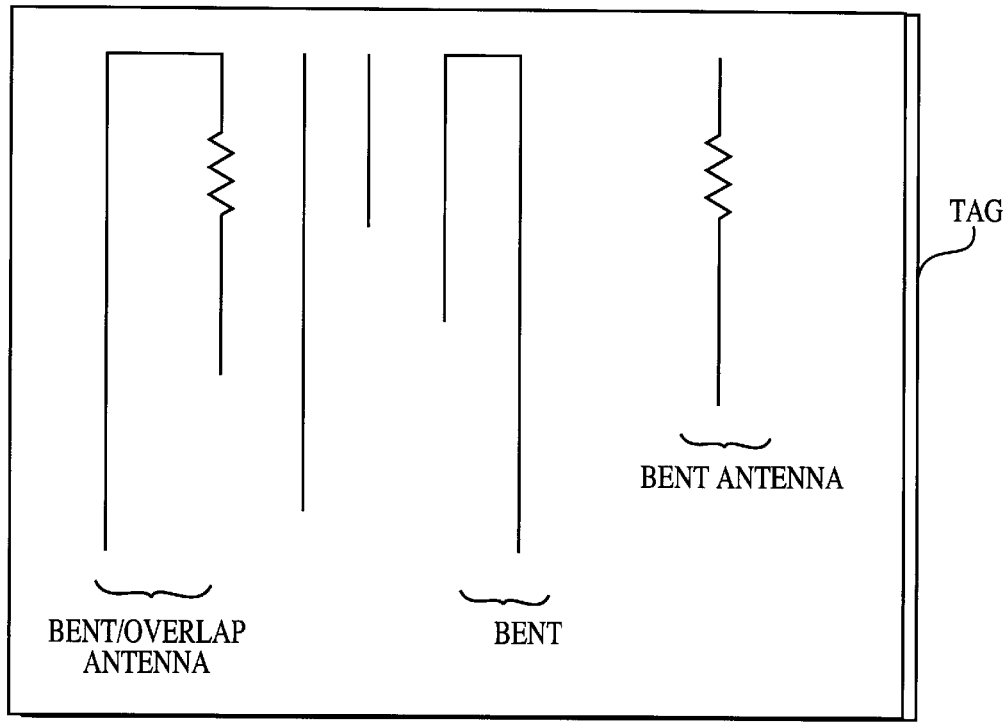

Now the frequency can also be changed by changing the characteristics of the dipole antenna. Therefore, instead of just having the dipole antenna as a straight line, it can be modified by making the antenna longer than the width of the tag. Thus, the frequency does not have to be a function of the width of the tag. FIG. 16 illustrates this configuration. In one design, the antenna is zig-zaged, in another embodiment the antenna is bent or overlapped, and in yet another embodiment, the antenna is both bent and zig-zaged.

According to this embodiment, there is not generally going to be any inductive coupling between these antennas, however, inductive coupling is also contemplated between antennas as well. The reason why inductive coupling is unlikely is because the frequencies used for the dipole antenna in FIGS. 15 and 16 are likely going to be in the gigahertz range as opposed to the LC circuits described above that are in the 10 megahertz range. Because the higher the frequency is used, the shorter the length of the antenna is needed. And at the higher frequencies there is less of a chance of inductive coupling.

On the other hand, we have also realized that at the higher frequencies, there is a greater chance of a bouncing effect. The bouncing effect is caused by anything that gets into the signals way and the signal just bounces off of it. A scatter of noise may be present. Therefore, the dipole antenna configuration is designed to also include or compensate for this bouncing effect.

Accordingly, we have determined that the multiple use of dipole antennas for identification purposes is possible.

Figure 17:
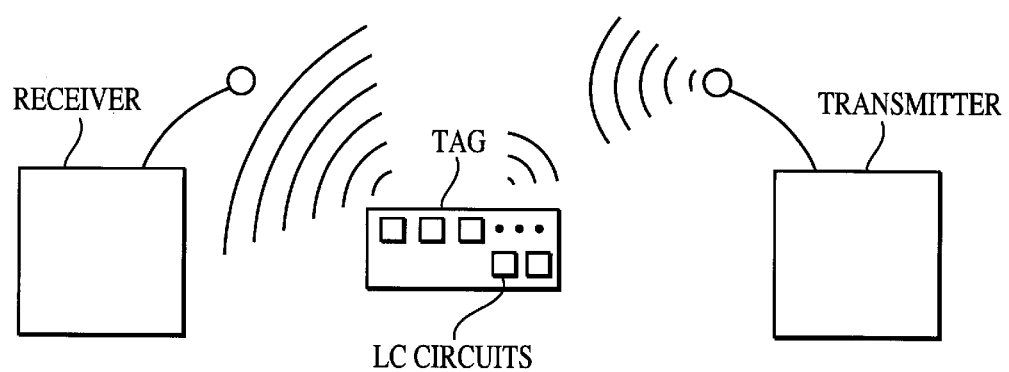
FIGS. 17–18 are illustrations of a system capable of utilizing and/or reading the identification tag illustrated in FIGS. 2–16.

Another aspect of the invention involves different methods of reading the LC resonant tags. One way the tag is read is using inductive coupling, where the tag is placed between a transmitter and a receiver as illustrated in FIG. 17. A continuous sweep can be utilized to transmit the signal for resonating the combination of LC circuits, a pulse or step, as described before. In addition, the phase shift between the transmitted signal and the resonated signal can also be used.

Figure 18:
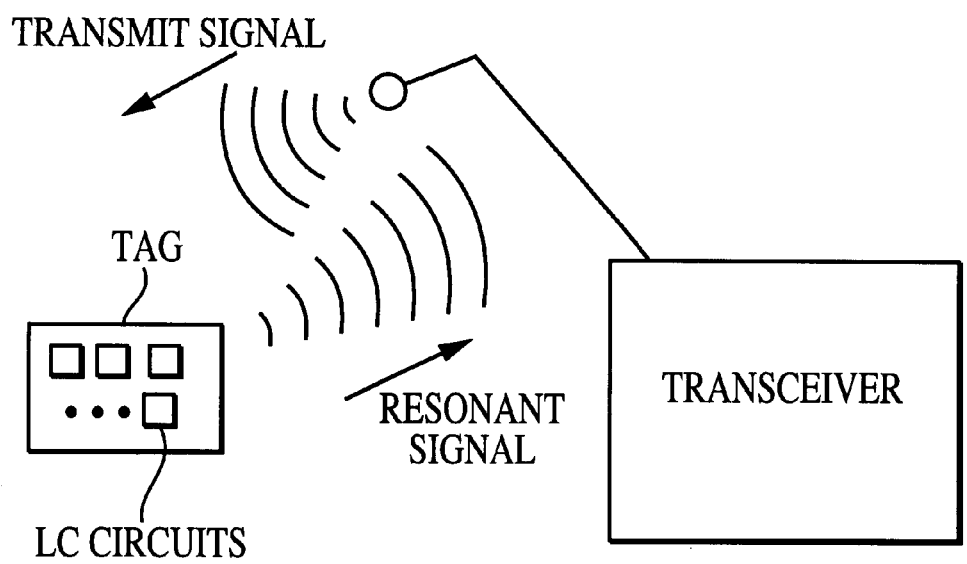

Instead of placing the tag between receive and transmit antennas, another method of reading the tags for inductive coupling is done with a single antenna. The one antenna which is both a transmit and receive antenna as illustrated in FIG. 18. Multiple ways of transmitting the signal can be utilized as described above in connection with using multiple antennas. The ringback can be used for detecting phaseshift using a sweep or pulse signal. The ringback is the signal which is resonated back.

Figure 19:
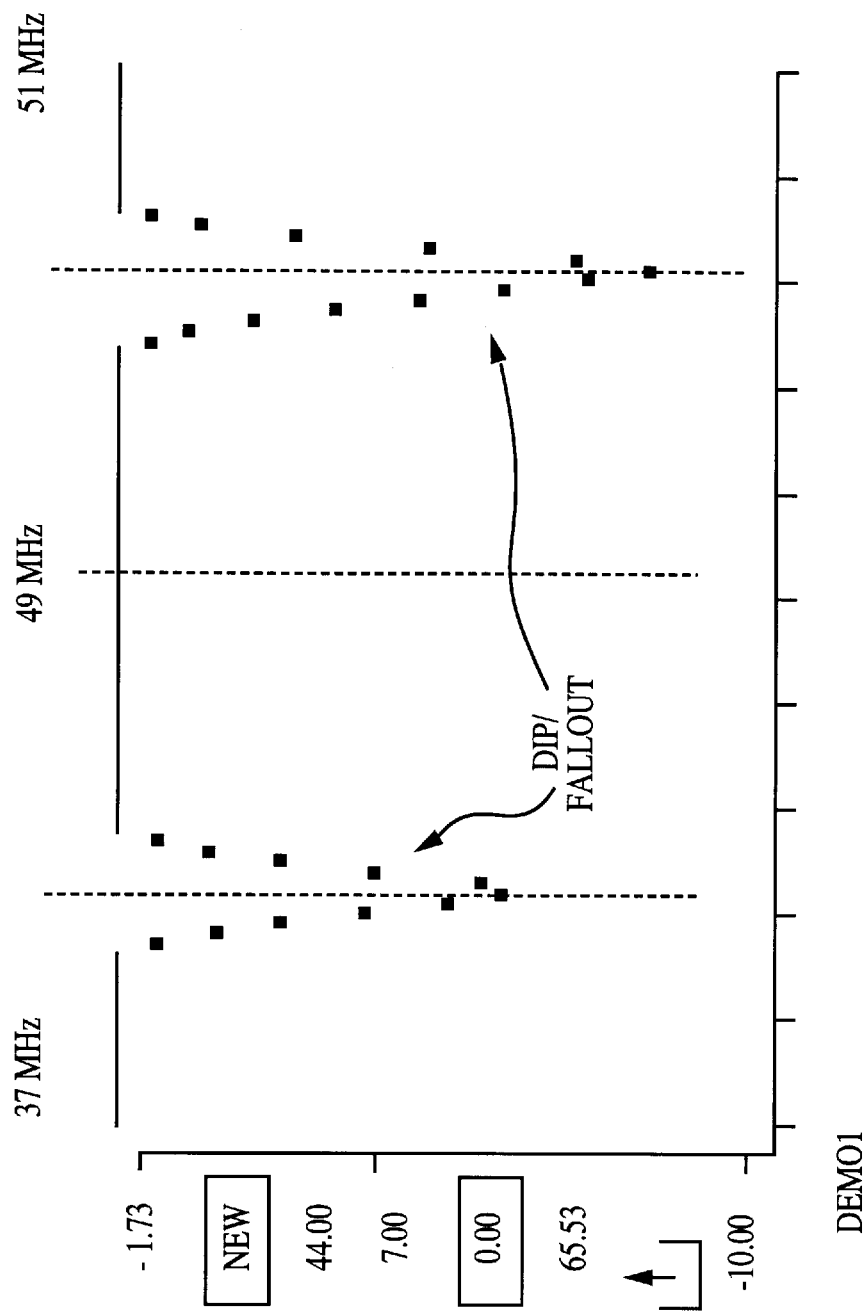
FIGS. 19–21 are illustrations of signal responses as a result of the systems illustrated in FIGS. 17–18.

Another signal we have also determined can be used for detecting whether the LC circuit is resonating is the dip or fallout in the transmitted signal, illustrated in FIG. 19. What happens is that the inductor coil first absorbs the signal and charges the capacitor based on receipt of a signal at which it resonates at. This results in a dip initially of the signal that is detected by the reader, and is based on the load on the antenna dropping, as the capacitor charges. Because the signal that is received by the LC circuit is the signal at which it resonates at, the energy of the signal is going to be sucked up by the coil and fed to the capacitive structure of the LC circuit for charging.

Once the capacitor is fully charged that there is no signal transmitted to the LC circuit at the resonant frequency, the LC circuit going to blast or resonate the energy back to the coil which is called the ringback signal. So, in general, we have determined that there is a dip of the energy on the antenna during capacitive charging, and then there is a blast of resonant energy back from that LC circuit. Thus, we have determined that either the ringback signal or the dip condition can be used to determined whether an LC circuit has resonated, thereby providing, for example, an indicator (such as a 1) for use in identification purposes.

Further, we have also determined that the combination of dip and ringback can be used to determine whether an LC circuit has resonated on the tag. This combination of signals has the additional benefit of verification or confirmation that an LC circuit has resonated.

FIG. 19 illustrates the dip in the signal where the center frequency is 44 megahertz. The dip spans plus or minus 7 megahertz so its 38, 37 megahertz. The reader sweeps through different frequencies for signals transmitted to the tag. The ringback would look pretty similar to the dip, except an upward spike would be encountered one cycle after the dip.

Returning to the use of phase shift to determine whether a specific LC circuit is active, if a one MHz signal is transmitted to the tag, and a phase shift is detected in that signal, then it has therefore been determined that there is a coil out there at the one MHz position that is active. If there is no phase shift, then the LC circuit does not exist, or has been deactivated.

Another aspect of the present invention involves the use of the Frequency Modulator Continuous Waves (FM CW) as reading resonance. This FM CW signal is used to gauge resonance. The different ways of transmitting the FM CW include, as discussed above, the sweep scan and step scan as discussed above, or the blasting of all the frequencies at one time and reading all the resonant signals simultaneously.

Figure 20:
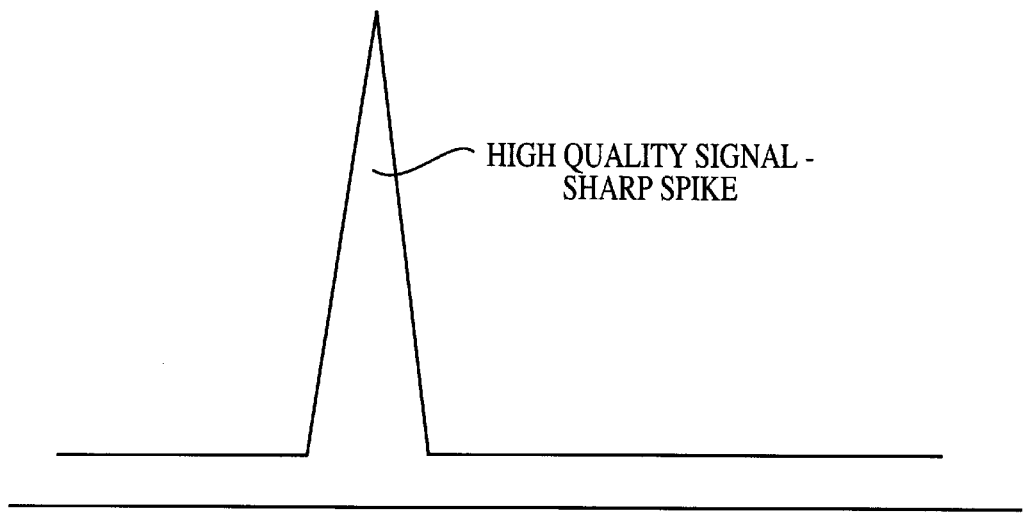
Figure 21:
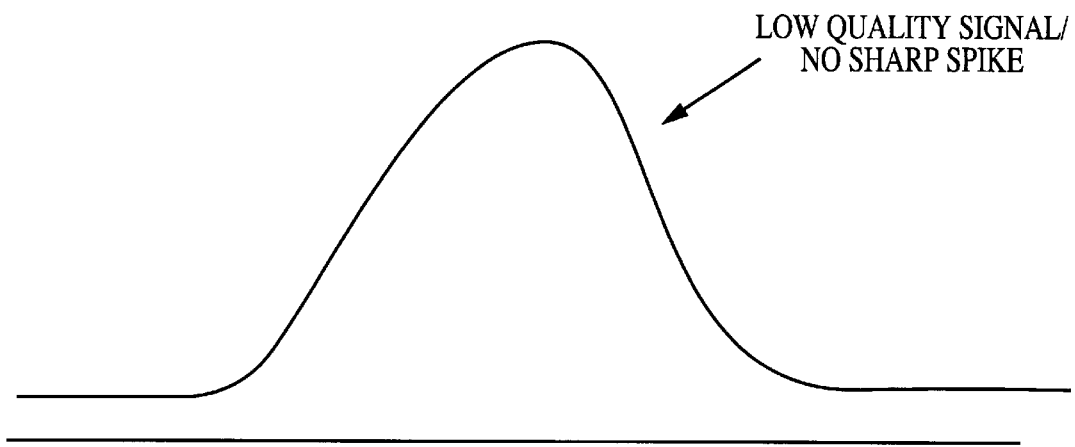

Another aspect of the present invention further includes the detection of the resonant signal based on signal quality. For example, FIG. 20 illustrates a resonant signal with high quality since the signal is quite sharp, similar to the signal illustrated in FIG. 19. On the other hand, FIG. 21 illustrates a resonant signal with low quality since the signal spans a wide area of frequencies. The high quality signal is, for example, considered as a 1 for a binary identification scheme, and the low quality signal is considered, for example as a 0. Of course, the low and high quality signal can be used in conjunction with other signals or lack thereof to create a three level or stage value for identification purposes.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tag which uses radio frequency waves transmitted from a scanning device in order to identify an item to which said tag is attached or with which said tag is associated, comprising:
    a first insulating layer having a top surface and a bottom surface;
    a plurality of resonant circuits formed on said first insulating layer, each of said plurality of resonant circuits formed on one of the top surface and the bottom surface of said first insulating layer and having a resonant frequency associated therewith, each of said plurality of resonant circuits including capacitance and inductance elements, said capacitance and inductance elements comprising an inwardly spiralled coil connected to an outwardly spiralled coil, each combination of the inwardly and the outwardly spiralled coils disposed on the same one of the top surface and bottom surface of said first insulating layer, wherein, in operation, each of said inwardly spiralled coil and said outwardly spiralled coil are coplanar with one another; and
    wherein said tag is associated with a binary number established by a pattern of ones and zeros depending on each circuits' resonance or nonresonance, respectively.

2. The tag as in claim 1, wherein said capacitance element further includes a dielectric dot.

3. The tag as in claim 2, wherein said inductance element is made from a conductive material.

4. The tag as in claim 1, wherein said plurality of circuits are located on a surface of said tag at spaced intervals of a distance far enough apart so that adjacent circuits do not electronically interfere with each other.

5. The tag as in claim 4, wherein said tag associates a bit of information with each of said plurality of circuits on the surface of said tag.

6. The tag as in claim 5, wherein said tag is made of a nonconductive material.

7. The tag as in claim 6, wherein the nonconductive material of said tag is at least one of paper, glass and plastic.

8. The tag as in claim 5, wherein said pattern of binary ones and zeros is established by varying numbers and positions of circuits being left blank.

9. The tag as in claim 5, wherein said pattern of binary ones and zeros is established by disabling a circuit on said tag.

10. A tag which uses radio frequency waves transmitted from a scanning device in order to identify an item to which said tag is attached or with which said tag is associated, comprising:
    a first insulating layer having a top surface and a bottom surface; and
    a plurality of resonant circuits formed on said first insulating layer, each of said plurality of resonant circuits formed on one of the top surface and the bottom surface of said first insulating layer and having a resonant frequency associated therewith, each of said plurality of resonant circuits including capacitance and inductance elements, said capacitance and inductance elements comprising an inwardly spiralled coil connected to an outwardly spiralled coil, each combination of the inwardly and the outwardly spiralled coils disposed on the same one of the top surface and bottom surface of said first insulating layer, wherein, in operation, each of said inwardly spiralled coil and said outwardly spiralled coil are coplanar with one another.

11. A tag as in claim 10, wherein said tag is associated with a binary number established by a pattern of ones and zeros depending on each of said plurality of resonant circuits resonating, or not resonating, respectively.

12. A tag as in claim 10, wherein at least one of said plurality of resonant circuits is tuned by at least one of changing a mass of the capacitance and changing a length of the inductance.

13. A tag as in claim 10, wherein said tag is associated with a three-state system established by each of said plurality of resonant circuits resonating at a high quality level, resonating at a low quality level, or not resonating.

14. A resonance tag including a plurality of resonant circuits each comprising a capacitor element, and an inductor element electrically connected to said capacitor element, and said capacitor element and said inductor element are disposed on a same surface of the resonance tag, and the capacitor and inductor elements comprising an inwardly spiralled coil connected to an outwardly spiralled coil, each combination of the inwardly and the outwardly spiralled coils disposed on the same one of the top surface and bottom surface of said resonance tag, wherein, in operation, each of said inwardly spiralled coil and said outwardly spiralled coil are coplanar with one another.

15. A resonant tag as in claim 14, wherein at least one of said plurality of resonant circuits is tuned by at least one of changing a mass of the single capacitor and changing a length of the single inductor coil.

16. A resonant tag as in claim 14, wherein said tag is associated with a three-state system established by each of said plurality of resonant circuits resonating at a high quality level, resonating at a low quality level, or not resonating.

17. A resonant tag as in claim 14, wherein said inductor coil includes first and second ends, and each of said first and second ends are connected to said capacitor.

18. A method of identifying an item to or with which a radio frequency identification tag is attached or associated, respectively, comprising the steps of:

providing said radio frequency identification tag having a plurality of resonant circuits formed on a first insulating layer, each of said plurality of resonant circuits formed on one of the top surface and the bottom surface of said first insulating layer and having a resonant frequency associated therewith, each of said plurality of resonant circuits including capacitance and inductance elements, said capacitance and inductance elements comprising an inwardly spiraled coil connected to an outwardly spiralled coil, each combination of the inwardly and the outwardly spiralled coils disposed on the same one of the top surface and bottom surface of said first insulating layer, wherein, in operation, each of said inwardly spiralled coil and said outwardly spiralled coil are coplanar with one another;

using a scanning device to interrogate said plurality of resonant circuits by transmitting varying radio frequency waves at which said plurality of resonant circuits may resonate to said radio frequency identification tag; and interrogating said plurality of resonant circuits to establish a pattern of binary ones and zeros.

19. The method as in claim 18, wherein said step of providing a radio frequency identification tag with a plurality of circuits is accomplished by etching said surface of said tag which has been coated with a layer of conductive material.

20. The method as in claim 18, wherein said step of providing a radio frequency identification tag with a plurality of circuits is accomplished by printing onto or pressing into said surface of said tag a conductive material.

21. A system, comprising:

a resonance tag including a plurality of resonant circuits each comprising a single capacitor, a single inductor coil electrically connected to said single capacitor, and an insulating layer separating portions of said single capacitor and said single inductor coil that cross over from each other, and said single capacitor and said single inductor coil disposed on a same surface of the resonance tag, said single capacitor and said single inductor coil comprising an inwardly spiralled coil connected to an outwardly spiralled coil, each combination of the inwardly and the outwardly spiralled coils disposed on the same one of a top surface and bottom surface of said insulating layer, wherein, in operation, each of said inwardly spiralled coil and said outwardly spiralled coil are coplanar with one another; and a scanning device configured to transmit radio frequency waves to said resonance tag and to said plurality of resonant circuits at varying frequencies which said plurality of resonant circuits may resonate to identify an item to which said resonance tag is attached or with which said resonance tag is associated.

22. The tag as in claim 1, wherein each combination of the inwardly and outwardly spiralled coils are arranged adjacent to each other on the surface.

23. The tag as in claim 22, wherein the inwardly and outwardly spiralled coils are connected to each other without an insulating layer separating the connection from at least one of the inwardly and the outwardly spiralled coils.

24. The tag as in claim 1, wherein each combination of the inwardly and outwardly spiraled coils are arranged adjacently and in alternating relationship to each other on the surface.

25. The tag as in claim 24, wherein the inwardly and outwardly spiralled coils are connected to each other without an insulating layer separating the connection from at least one of the inwardly and the outwardly spiralled coils.

26. The tag as in claim 10, wherein each combination of the inwardly and outwardly spiraled coils are arranged adjacent to each other on the surface.

27. The tag as in claim 26, wherein the inwardly and outwardly spiralled coils are connected to each other without an insulating layer separating the connection from at least one of the inwardly and the outwardly spiralled coils.

28. The tag as in claim 10, wherein each combination of the inwardly and outwardly spiraled coils are arranged adjacently and in alternating relationship to each other on the surface.

29. The tag as in claim 28, wherein the inwardly and outwardly spiralled coils are connected to each other without an insulating layer separating the connection from at least one of the inwardly and the outwardly spiralled coils.

30. The tag as in claim 14, wherein each combination of the inwardly and outwardly spiraled coils are arranged adjacent to each other on the surface.

31. The tag as in claim 30, wherein the inwardly and outwardly spiralled coils are connected to each other without an insulating layer separating the connection from at least one of the inwardly and the outwardly spiralled coils.

32. The tag as in claim 14, wherein each combination of the inwardly and outwardly spiraled coils are arranged adjacently and in alternating relationship to each other on the surface.

33. The tag as in claim 32, wherein the inwardly and outwardly spiralled coils are connected to each other without an insulating layer separating the connection from at least one of the inwardly and the outwardly spiralled coils.

34. The method as in claim 18, further including the step of arranging each combination of the inwardly and outwardly spiraled coils adjacent to each other on the surface.

35. The method as in claim 34, further including the step of connecting the inwardly and outwardly spiralled coils to each other without an insulating layer separating the connection.

36. The method as in claim 18, further including the step of arranging each combination of the inwardly and outwardly spiraled coils adjacently and in an alternating relationship to each other on the surface.

37. The method as in claim 36, further including the step of connecting the inwardly and outwardly spiralled coils to each other without an insulating layer separating the connection.

38. The system as in claim 21, wherein each combination of the inwardly and outwardly spiraled coils are arranged adjacent to each other on the surface.

39. The system as in claim 38, wherein the inwardly and outwardly spiralled coils are connected to each other without an insulating layer separating the connection from at least one of the inwardly and the outwardly spiralled coils.

40. The system as in claim 21, wherein each combination of the inwardly and outwardly spiraled coils are arranged adjacently and in alternating relationship to each other on the surface.

41. The system as in claim 40, wherein the inwardly and outwardly spiralled coils are connected to each other without an insulating layer separating the connection from at least one of the inwardly and the outwardly spiralled coils.

42. A tag which uses radio frequency waves transmitted from a scanning device in order to identify an item to which said tag is attached or with which said tag is associated, comprising:

a first insulating layer having a top surface and a bottom surface;

a plurality of resonant circuits formed on said first insulating layer, each of said plurality of resonant circuits formed on one of the top surface and the bottom surface of said first insulating layer and having a resonant frequency associated therewith, each of said plurality of resonant circuits including capacitance and inductance elements, said capacitance and inductance elements comprising an inwardly spiralled coil connected to an outwardly spiralled coil, each combination of the inwardly and the outwardly spiralled coils disposed on said first insulating layer, wherein, in operation, each of said inwardly spiralled coil and said outwardly spiralled coil are coplanar with one another.

43. A tag according to claim 42, wherein the inwardly and the outwardly spiralled coils are in at least one of a serial and non-overlapping planar relationship in operation.

44. A tag according to claim 42, wherein the inwardly and the outwardly spiralled coils are in a serial and non-overlapping planar relationship in operation.

45. A tag according to claim 42, wherein the inwardly and the outwardly spiralled coils are in a serial relationship on a substantially same plane in operation.

46. A tag which uses radio frequency waves transmitted from a scanning device in order to identify an item to which said tag is attached or with which said tag is associated, comprising:

a first insulating layer having a top surface and a bottom surface;

a plurality of resonant circuits formed on said first insulating layer, each of said plurality of resonant circuits formed on one of the top surface and the bottom surface of said first insulating layer and having a resonant frequency associated therewith, each of said plurality of resonant circuits including capacitance and inductance elements, said capacitance and inductance elements comprising an inwardly spiralled coil connected to an outwardly spiralled coil, each combination of the inwardly and the outwardly spiralled coils disposed on said first insulating layer, without the first insulating layer or other insulating layer disposed between the inwardly and the outwardly spiralled coils, wherein, in operation, each of said inwardly spiralled coil and said outwardly spiralled coil are coplanar with one another.

47. A tag which uses radio frequency waves transmitted from a scanning device in order to identify an item to which said tag is attached or with which said tag is associated, comprising:

a first insulating layer having a top surface and a bottom surface;

a plurality of resonant circuits formed on said first insulating layer, each of said plurality of resonant circuits formed on one of the top surface and the bottom surface of said first insulating layer and having a resonant frequency associated therewith, each of said plurality of resonant circuits including capacitance and inductance elements, said capacitance and inductance elements comprising an inwardly spiralled coil connected to an outwardly spiralled coil at a center of the spiral, each combination of the inwardly and the outwardly spiralled coils disposed on said first insulating layer, wherein, in operation, each of said inwardly spiralled coil and said outwardly spiralled coil are coplanar with one another.

* * * * *